W. C. M. MATTERSON.
GEAR CUTTING MACHINE.
APPLICATION FILED AUG. 28, 1920.
1,373,344.
Patented Mar. 29, 1921.
5 SHEETS—SHEET 3.
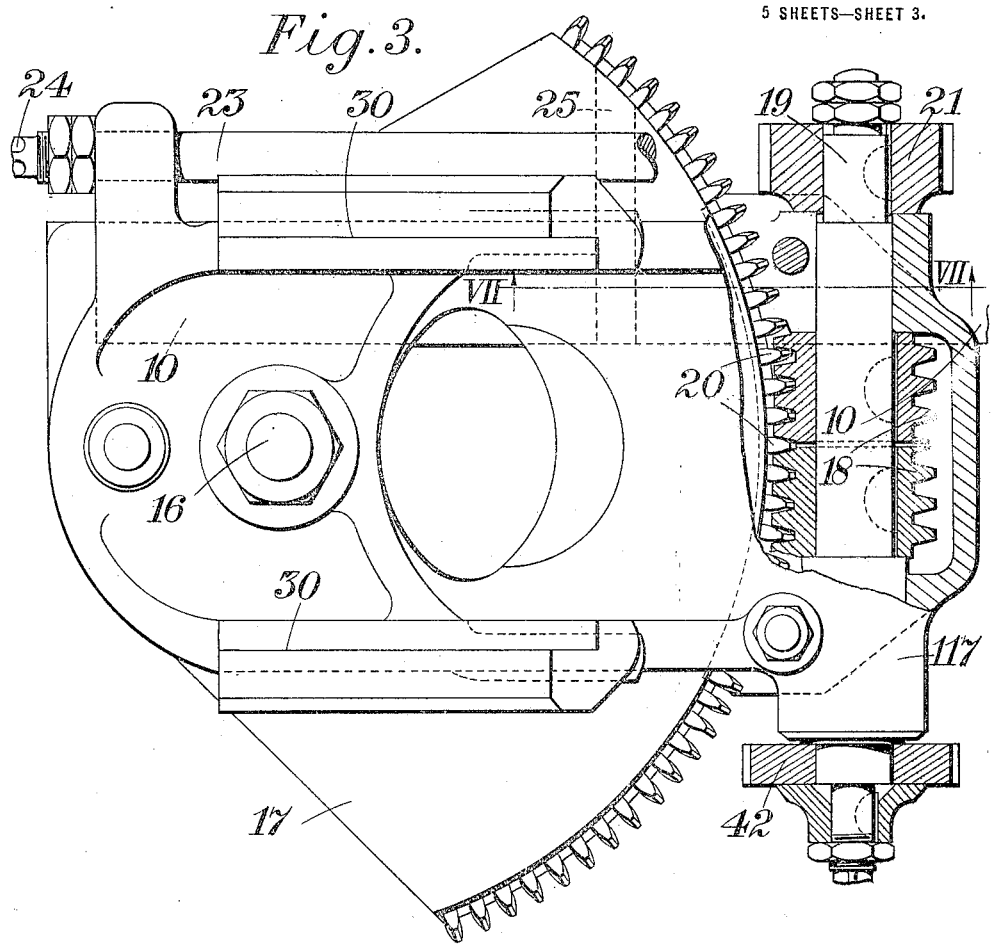
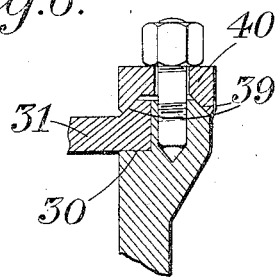
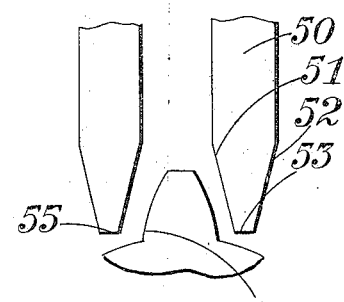
Inventor
W. C. M. Matterson
by Wilkinson & Giusta
Attorneys.

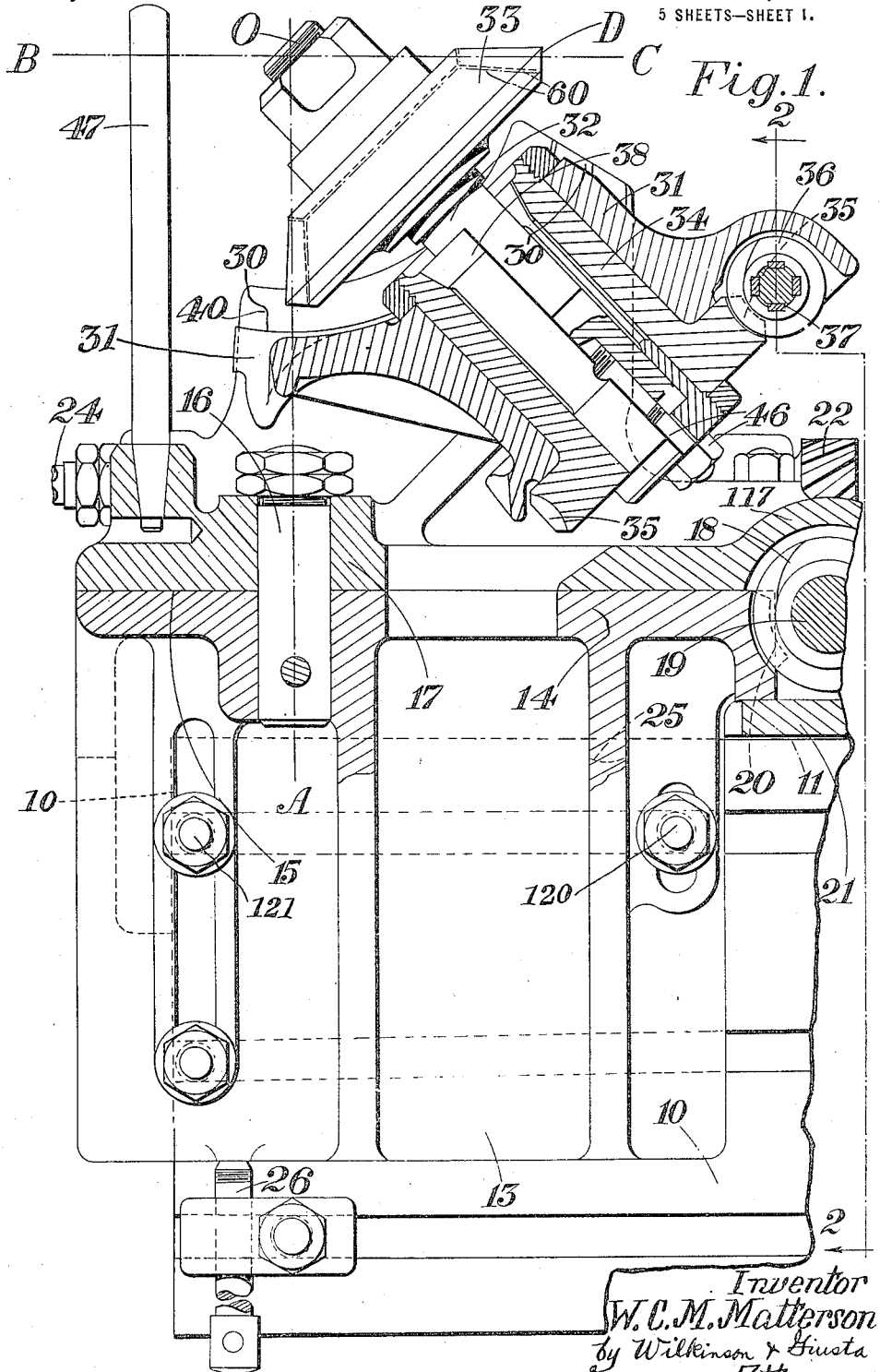

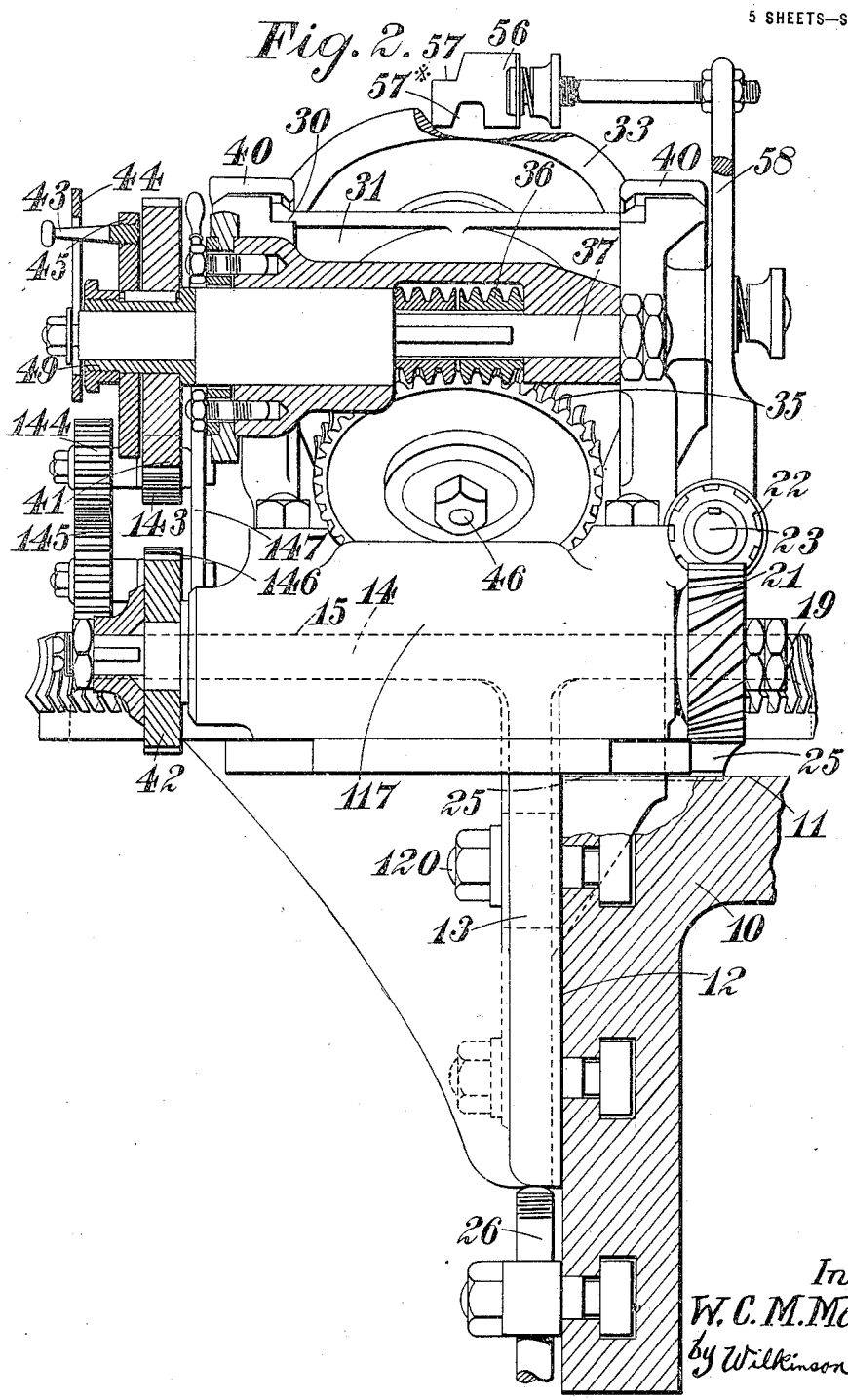

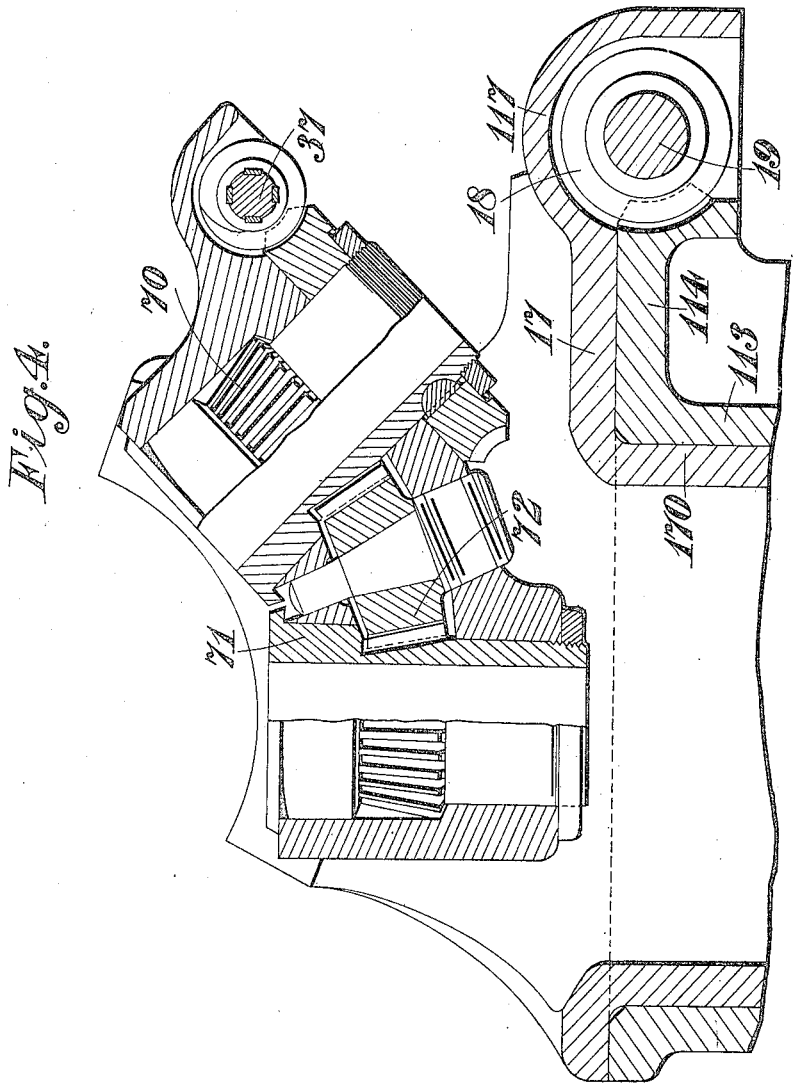

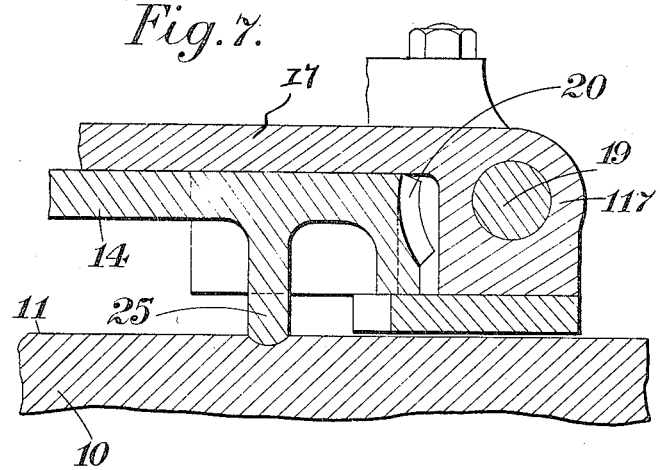
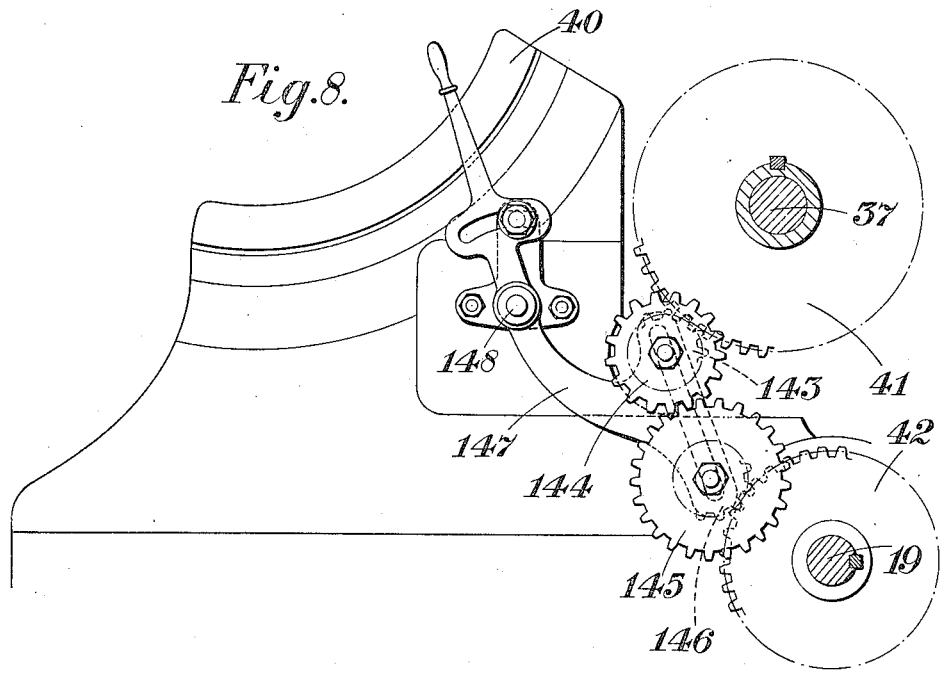

UNITED STATES PATENT OFFICE.

WILLIAM COLLEY MONKTON MATTERSON, OF ROCHDALE, ENGLAND.

GEAR-CUTTING MACHINE.

1,373,344.     Specification of Letters Patent.     Patented Mar. 29, 1921.

Application filed August 28, 1920. Serial No. 406,669.

*To all whom it may concern:*

Be it known that I, WILLIAM COLLEY MONKTON MATTERSON, a subject of the King of England, formerly residing at Northfield, in the county of Warwickshire, now of Rochdale, in the county of Lancaster, England, have invented certain new and useful Improvements in Gear-Cutting Machines, of which the following is a specification.

This invention relates to gear-cutting machines, and has for its main object to provide a self-contained attachment whereby a machine-tool, such as a shaping, planing or slotting-machine in which a single cutting-tool is reciprocated relatively to the work, can be adapted to cut bevel gear-wheels. The operation of the attachment is to be such that the teeth shall be correctly generated and not formed by profile cutting or merely copying.

With this end in view, therefore, the invention provides for a shaping, planing, or slotting machine, a self-contained attachment comprising tooth-generating mechanism mounted on a base, which base is adapted to be secured to the table of the machine-tool. The tooth generating mechanism may be of any known or desired type, which can impart to the blank a rolling motion about the apex point of its pitch-cone.

The said base may be secured to the vertical face of the machine-tool table and another object is to provide that the bottom of each gap between the teeth of a wheel cut with the aid of the attachment shall lie at the correct angle to the axis of the wheel. For this purpose means are provided for tilting the base relatively to the table.

A further object is to render the attachment suitable for cutting bevel gear-wheels of widely different conicities. To this end, two work-carrying spindles are provided, which are inclined to one another, and whereof the axes intersect one another at the point to be occupied by the apex of the pitch-cone of a wheel to be cut, so that the blank may be placed on either spindle according to which of them is more conveniently situated.

One embodiment of the invention and a modification thereof are illustrated by way of example in the accompanying drawings, wherein—

Figure 1 is a side elevation, mainly in vertical section, but having some parts omitted for clearness, showing one form of an attachment according to the invention for machine-tools of the kind referred to.

Fig. 2 is an end elevation partly in section on the line 2—2 of Fig. 1 looking in the direction indicated and Fig. 3 is a plan of Fig. 1, partly broken away and partly in horizontal section, and with the work-carrying spindle and its immediate supports omitted for clearness;

Fig. 4 is a view similar to Fig. 1 showing such parts of the machine as are necessary to illustrate a modified construction of attachment according to the invention;

Fig. 5 is a diagram to illustrate the setting of the cutting-tool, and

Fig. 6 is a detail;

Fig. 7 is a detail sectional view taken on the line VII—VII in Fig. 3, and

Fig. 8 is a detail side elevation showing one form of change gear.

Like reference characters indicate like parts throughout the drawings.

Referring first to Figs. 1 to 3, the ordinary table of a machine, such as a shaping-machine, is indicated at 10 having horizontal and vertical faces at 11, 12 respectively. In this particular embodiment of the invention it is preferred to secure the attachment to the vertical face 12 of the table, and the base 13, 14 of the attachment accordingly comprises a vertical portion 13, suitably ribbed and shaped for attachment to the face 12, with a horizontal portion 14. The upper face 15 of the part 14 is flat and is provided with a pivot-pin 16 whereon is rotatably mounted the main body of the attachment. This body comprises a flat sector-shaped plate 17 which bears on the surface 15 and carries curved guide-ways 30 described hereinafter. The rotation of the plate 17 on the base is effected by a worm-gear 18 mounted on a shaft 19 carried in suitable bearings in an extension 117 of the plate 17, and meshing with teeth 20 formed on a part of the edge of the horizontal plate 14 of the base. As shown in Fig. 1, the worm-gear 18 is made in two halves so that wear can be taken up by tightening the nuts on the end of its shaft 19. This shaft also carries a gear wheel 21 which meshes with a gear wheel 22 fast on a shaft 23 (Figs. 2 and 3) that is journaled in the plate 17 and can be driven in any convenient manner, for example by means of the squared end 24 thereof. Consequently by turning the shaft 23 the plate 17 and all the parts carried thereby can be turned in either direction about the vertical axis of the pivot pin 16.

As shown in Figs. 1 and 6, the base of the attachment is provided on the underside of the horizontal plate 14 with a depending rib 25, which is curved at its lower end and is so positioned as to rest in a groove formed to receive it in the horizontal face 11 of the table 10. This rib constitutes a fulcrum for the base 13, 14 which can be secured by bolts 120, 121 in any position into which it is adjusted. An adjusting-screw 26 (Figs. 1 and 2) is mounted on the table 10 and adapted to rock the base aforesaid about the fulcrum 25, that is to say clockwise or anti-clockwise in Fig. 1, for the purpose hereinafter described.

The body of the attachment comprises the above-mentioned two curved guides 30 which are formed integrally with or attached to the portion 17. These guides are cylindrical, the axis of the cylinder being indicated at the point O, Fig. 1, the axis being normal to the plane of the paper in that figure. The point O is determined by the intersection of the line OA which is the axis of the vertical pivot-pin 16, with the line BC which is the line of travel of the cutting-tool. The cylindrical guides 30 are preferably equidistant from the plane containing the lines OA and BC.

Upon the guides 30 there is mounted a work-carrier 31 which is provided with suitable bearings to support a spindle or arbor 32 whereon is mounted a wheel blank 33 whereof the teeth are to be cut.

The support for the spindle 32 comprises a bush 34 formed at its lower end with the teeth 35, which are engaged by a worm 36. This worm is shown made in two halves and is mounted on a shaft 37 carried in suitable bearings in the part 31. The spindle 32 is non-rotatably secured within the bush 34, as for example, by an expanding collet 38 or any other convenient means, and the wheel-blank 33 is similarly secured so as to be non-rotatable on the spindle 32.

As shown in Fig. 2 the shaft 37 is coupled with the shaft 19 by change gear. This gear comprises a gear-wheel 41 operatively connected with the shaft 37, a gear wheel 42 fast on the shaft 19, and change gears 143, 144, 145, 146 carried by an adjustable arm 147 mounted to rock about a pin 148 fixed on the side of the body 31. Consequently, rotation of the shaft 19 produces not only rotation of the plate 17 about the pin 16, but also rotation of the blank about its own axis, and by suitably selecting the gearing connecting the two shafts 13 and 19 any desired relative speeds of rotation of the blank and the plate 17 can be obtained.

A dividing head of any ordinary or well-known type is used in combination with the shaft 37 in order to obtain any desired angular setting of the shaft 37 with respect to the shaft 19. As shown in Fig. 2 this dividing head comprises a slotted arm 44 that is fast on one end of the shaft 37 and carries a pin that can be screwed into any one of a number of holes arranged in circles in a disk 45 that is keyed together with the gear wheel 41 on a sleeve 149 free to rotate about the reduced end of the shaft 37. When the side of one tooth has been cut in the blank and it is required to cut the corresponding side of the next tooth, it is therefore only necessary to withdraw the pin 43 from one hole and to insert it into another hole in order to turn the blank through the correct angle in either direction.

The work-carrier 31 is so mounted that the axis of the spindle 32 passes through the point O, and it will be appreciated that whatever the angular adjustment of the work-carrier 31 on the guides 30, the said axis will always pass through the point O.

One method of securing the work-carrier 31 on the guides 30 is illustrated in Fig. 6. The edges of the two parts are beveled or chamfered as shown at 39, and a bridge-piece 40 with similarly shaped edges is pressed down on to them by nuts mounted on suitable studs. The wedging action of the bridge-piece 40 draws the part 31 laterally and downward on to the guides 30 and insures a very rigid but easily adjustable securing of the two parts together.

It is requisite in cutting a bevel-gear-wheel that the wheel-blank should be so mounted that the line along which the cutting-tool moves when cutting the pitch-circle should lie on the surface of the pitch-cone, and should pass through the apex of the pitch-cone. It follows, therefore, that in this machine the pitch-cone of the wheel-blank must occupy such a position that the horizontal plane, (that is to say the plane normal to the paper in Fig. 1) is tangential to it. Further, if a true rolling movement of the pitch-cone with respect to the cutting-tool is to be obtained, the apex of the pitch-cone must lie on the line OA.

In mounting the wheel-blank in position, the work-carrier 31 is first set to the appropriate angle, so that the axis of the spindle 32 makes an angle with the horizontal BC which is equal to half the angle of the apex of the cone. To facilitate this it is convenient to have a scale marked on the guides 30. The wheel-blank 33 is then mounted on the spindle 32, and since the dimensions of the pitch-cone are known, it is only necessary to adjust its position longitudinally of the spindle 32 to insure the apex of the pitch-cone coinciding with the point O. This adjustment is most easily effected by arranging that the spindle 32 is movable endwise in the bush 34 by a fine-adjustment device, such as the screw and nut 46. The adjustment is most easily made by measuring the distance from the point O to the point D, where the wheel-blank intersects the line OC, and in order to facilitate this a gage-rod 47 is mounted in the body 17 at a fixed distance from the axis OA of the pivot-pin 16. Any ordinary micrometer device can then be used for measuring the distance from the gage-rod 47 to the point D so that the distance OD can be set with any desired degree of accuracy.

When setting up the machine the proper location of the cutting-tool in relation to the blank, is also important. Referring to Fig. 5, the cutting-tool 50 is made with a profile similar to the straight sided teeth of an involute rack (in the case of cutting involute teeth) of such a shape that the gear wheel to be cut could mesh with it. The two straight cutting edges 51, 52, for cutting opposite sides of a tooth on the wheel-blank, may be set closer together than would be the corresponding sides of the tooth of the rack, as it is only desired to cut one side of each wheel-tooth at one operation. In cutting the wheel-teeth it is necessary that the points 53, 55 should travel in the vertical plane containing the line CO, which passes through the apex of the pitch-cone. In practice, the corners at which these points are situated are rounded off, but the theoretical consideration still holds. When the one side of a tooth has been cut in the blank by the point 55 and the other side of the tooth indicated at 54 is to be cut it is necessary that the point 55 should occupy the position formerly occupied by the point 55 so that the tool after cutting one side of each of the teeth of the wheel-blank requires to be reset before cutting the other sides of the same teeth. In order to facilitate the setting of the tool, a gage illustrated in Fig. 2 is provided on the machine. The gage comprises a block or plate 56 bent at right angles and having in one limb a notch 57 of the same profile as the part of the tool around the point 55, and this gage is carried on a swinging arm 58, rotatably mounted so that the gage can be swung up beside the cutting-tool or swung out of the way when the cutting operation is to be made. The arm 58 is provided with any suitable frictional control to retain it in the desired position, and suitable adjusting devices are provided for accurately setting the gage in the desired position. In the preferred form, the gage is a duplex one being provided with a second notch 57 which corresponds with the part of the cutting-tool in the neighborhood of the edge 53, so that it is only necessary to turn the block 56 about its own axis through 180 degrees to bring it into position for setting either side of the tools in the desired position. Conveniently the block 56 is frictionally held in the desired position.

In the operation of this machine, the wheel-blank and the cutting-tool are set up in the correct position as above described for cutting one side of one tooth. The transmission-gearing between the shafts 19 and 37 is so selected that when the shaft 23 is rotated, the wheel-blank is rotated at the required speed and has given to it a rolling motion of its pitch-cone on the plane (indicated in Fig. 1) normal to the sheet and intersecting it on the line BC. When the tool reciprocates with a suitable stroke in the direction OC and is automatically fed downward it will then cut one side of a tooth in the blank by a generating process.

It will be seen that with the parts set as in Fig. 1, the bottom surface 60 of a gap between the teeth does not lie in a horizontal plane parallel with the line BC, since it is necessary in this position of the wheel that the line 60 should pass through the apex of the pitch-cone at O. The straight line reciprocation of the cutting-tool would not permit this were the parts set in the position illustrated, and in order to bring the line 60 parallel to the line OC, the adjusting screw 26 above-mentioned is used to rock the whole attachment about the fulcrum 25 in an anti-clockwise direction in Fig. 1, until the line 60 is in the desired position. During the stroke of the tool toward the apex of the pitch-cone therefore the tool virtually rises, and thereby effects the necessary change in the depth of the gap, while at the same time cutting the teeth by a generating process.

The cutting operation is then commenced, and one side of a tooth is formed. The change gear between the shafts 19 and 37 is then disconnected and the dividing head 43, 44, 45 is used to set around the wheel-blank into the correct position for forming the corresponding side of the next tooth. The change gear is re-connected and the operation repeated until one side of all the teeth of the wheel-blank has been formed. In a similar manner the other sides of all the teeth are formed to finish the cutting of the wheel-blank. It will be appreciated that teeth of various shapes can be cut depending on the relation and the speed of rotation of the blank about its own axis to the speed of the rotatory motion of translation of the blank about the vertical axis OA, and also on the direction of these component parts of the actual motion of the blank during the cutting operation.

In the modified construction of the hereinbefore described attachment, illustrated in Fig. 4, there are provided two work-carrying bushes 70, 71, corresponding to the bush 34. These are both set so that their axes pass through the point O to be occupied by the apex of the pitch-cone, and the purpose of using two is to permit the device to be used for cutting bevel gear-wheels of widely different conicities without seriously increasing the overall size or interfering with the compactness of the general construction. Thus, crown wheels can be cut when the blank is mounted in the bush 71. It will be seen that a construction similar to that illustrated in Figs. 1, 2 and 3, could be used if the cylindrical guides 30 were made sufficiently long, but this is not desirable and an equivalent effect can be obtained by the construction illustrated in Fig. 4. The operation of this modified machine is exactly similar to that already described, for the two bushes 70, 71 are provided with an intermeshing gear 72 so that they are both driven by the worm-gear on the shaft 37. In this construction the table 17 is pivotally mounted by means of a tubular pivot 170 on the base 113, 114 which is modified accordingly to receive it. These slight modifications are necessary in order to render the lower part of the bushing 71 accessible for tightening up its expanding collet or adjusting the position of its work-spindle, but such modifications do not affect the invention.

While two specific constructions of this invention have been described and illustrated, it will be appreciated that the invention is not limited to all the details hereinbefore mentioned or to the exact construction of the parts, as many variations may be made without departing from the scope of the present invention as set forth in the appended claims. Thus, for example, if only miter wheels are to be cut the part 31 may be made integral with the parts 17 and 30.

What I claim as my invention and desire to secure by Letters Patent is:—

1. A self-contained attachment for machine-tools of the class referred to, comprising in combination a base-plate adapted to be mounted on the table of a machine-tool, and tooth-generating mechanism mounted on said base-plate, said mechanism comprising a spindle for carrying a blank in positional relation to the cutter of the machine-tool, means for rotating said spindle about its own axis, and means for simultaneously imparting to said spindle a rotational motion of translation about an axis that intersects the former axis, whereby a rolling motion can be imparted to the blank, so that teeth can be cut thereon by said cutter by a generating process.

2. The combination with the table of a machine-tool of the class referred to, of a self-contained attachment, comprising a base-plate mounted to rock on a horizontal face of the table of the machine-tool, tilting means for supporting and rocking said base plate, and tooth-generating mechanism mounted on said base plate, said mechanism comprising a spindle for carrying a blank in positional relation to the reciprocatory cutter of the machine-tool, means for rotating said spindle about its own axis, and means for simultaneously imparting to said spindle a motion of translation about an axis that intersects the former axis at right-angles, whereby a rolling motion can be imparted to the blank.

3. A self-contained attachment for machine-tools of the class referred to, comprising in combination a base-plate adapted to be mounted on the table of a machine-tool, and tooth-generating mechanism mounted on said base-plate, said mechanism comprising a spindle for carrying a blank in positional relation to the cutter of the machine-tool, said spindle having its axis so disposed that the same cuts the horizontal plane in which the cutter reciprocates at a point coincident with the apex point of the wheel that is to be cut from the blank, means for rotating said spindle about its axis, and means for simultaneously imparting to said spindle a motion of translation about an axis that intersects the former axis at said apex point, whereby a rolling motion can be imparted to the blank.

4. A self-contained attachment for machine tools of the class referred to, comprising in combination a base-plate adapted to be mounted on the table of a machine-tool, and tooth-generating mechanism mounted on said base-plate, said mechanism comprising a spindle for carrying a blank in positional relation to the cutter of the machine-tool, said spindle having its axis so disposed that the same cuts the horizontal plane in which the cutter reciprocates at a point coincident with the apex point of the wheel that is to be cut from the blank, means for rotating said spindle about its axis, and means for simultaneously imparting to said spindle a motion of translation about an axis that intersects the former axis at said apex point and a second spindle for carrying a blank in positional relation to the cutter of the machine-tool, the axis of which second spindle is disposed at an angle to the axis of rotation of the former spindle and intersects the same at said apex point, and means operatively connecting said spindles together for imparting the rotation of one spindle to the other, whereby a rolling motion can be imparted to the blank.

In testimony whereof I affix my signature.

WILLIAM COLLEY MONKTON MATTERSON.